June 8, 1965

G. WEEKLEY 3,188,371

COATING APPARATUS AND METHOD THEREFOR

Filed Oct. 13, 1960

INVENTOR
GOLDWYN WEEKLEY

BY *Stowell & Stowell*

ATTORNEYS

June 8, 1965
G. WEEKLEY
3,188,371
COATING APPARATUS AND METHOD THEREFOR
Filed Oct. 13, 1960
3 Sheets-Sheet 2
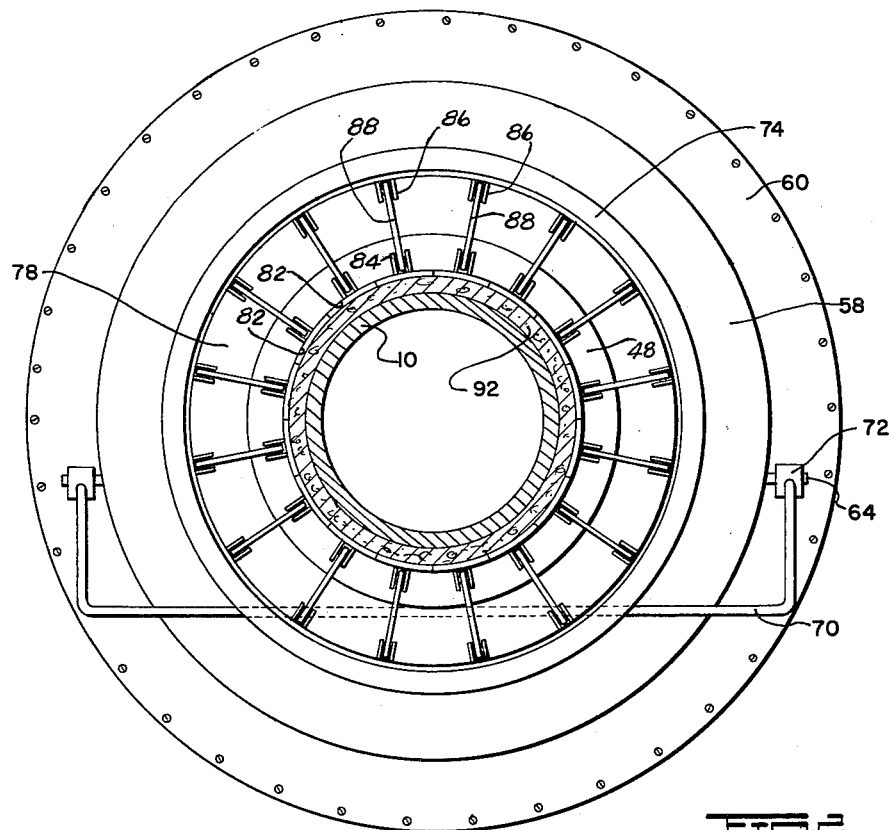
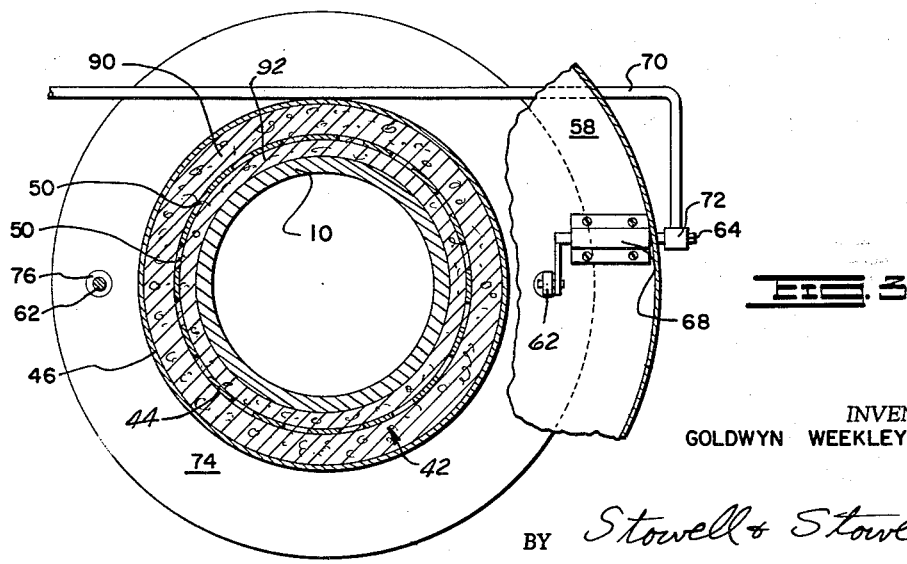
INVENTOR
GOLDWYN WEEKLEY
BY Stowell & Stowell
ATTORNEYS

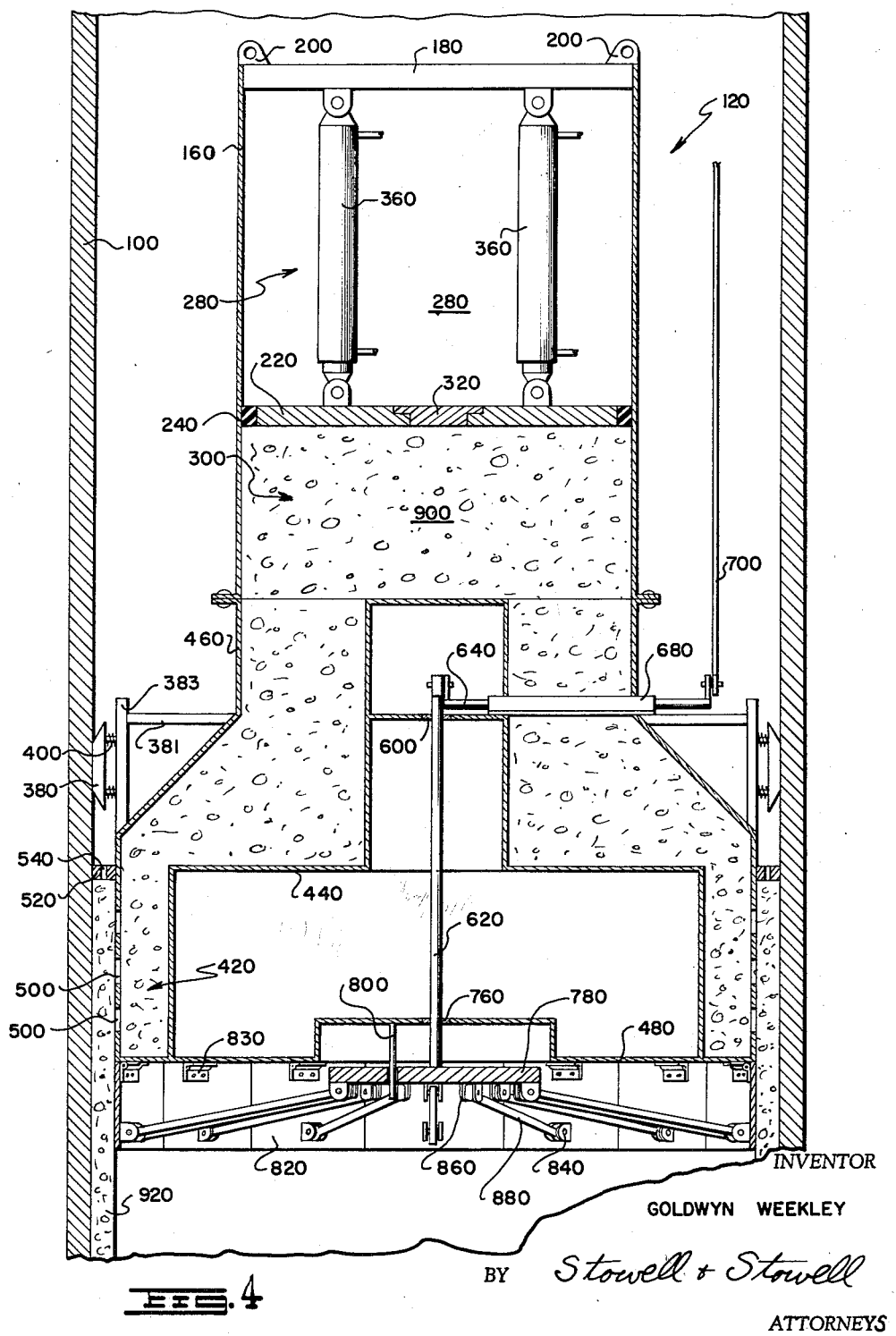

United States Patent Office 3,188,371
Patented June 8, 1965

3,188,371
COATING APPARATUS AND METHOD THEREFOR
Goldwyn Weekley, 24 Chestnut St., Belle Vernon, Pa.
Filed Oct. 13, 1960, Ser. No. 62,471
10 Claims. (Cl. 264—269)

This invention relates to a method and apparatus for applying a coat of cementitious material to a pipe or the like.

In the fabrication of certain conduits, it is desirable to line or coat a pipe either interiorly or exteriorly with cementitious material, either for strengthening the pipe or imparting to it whatever qualities the cementitious material possesses, as for example resistance to heat or chemical attack. In order that the finished lining be uniform, it is desirable that it be applied by some apparatus which can control the thickness and manner in which the coating is applied. Since some pipes may be lined in situ, i.e., not at their place of manufacture, it is further desirable that such an apparatus be capable of lining even though the pipe axis is other than vertical.

According to the invention, the lining apparatus includes a chamber provided with a plurality or orifices or apertures. Cementitious lining material in the chamber is exuded from the orifices as by the force of a piston and trowels, carried by the apparatus, smooth the freshly deposited lining with a force which may be varied, all while the device is being moved relative to the pipe. By virtue of the construction of the apparatus, the deposition of the cementitious lining material is independent of the orientation of the pipe being lined.

In the drawings:

FIGURE 2 is a bottom plan view of FIGURE 1;

FIGURE 3 is a view taken along line 3—3 of FIGURE 1; and

FIGURE 4 is a vertical cross-section of another embodiment of the coating apparatus of the invention wherein the interior surface of a pipe is coated.

Figure 1:
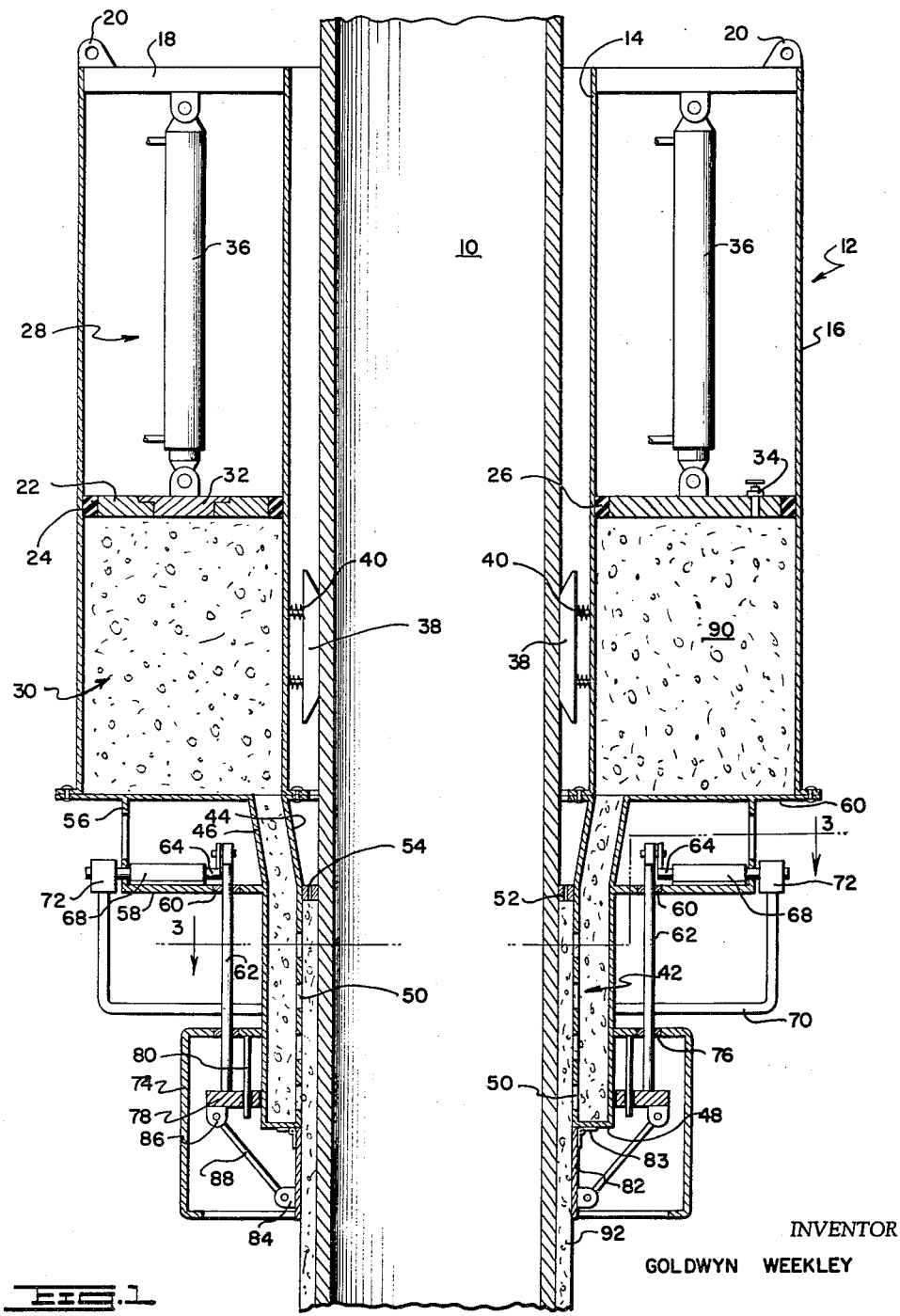
FIGURE 1 is a vertical cross-section of one embodiment of the coating apparatus of the invention wherein the exterior surface of a pipe is coated.

Referring now to FIGURE 1 of the drawings, the numeral 10 denotes a pipe segment which is to be exteriorly coated with cementitious material. An apparatus denoted by the numeral 12 surrounds the pipe 10 and includes two concentric cylindrical members 14 and 16 which define an annular cavity or chamber between them. A reinforcing, spacing element 18 is secured to the upper peripheral portions of cylinders 14 and 16, the element 18 being provided with a plurality of circumferentially spaced eyes 20 whose function will be later described. An annular piston 22 is slidably positioned within the chamber between elements 14 and 16 and is provided with outer and inner seal elements 24 and 26 at its peripheries. The piston 22 thus defines an upper chamber portion 28 and a lower chamber portion 30. Piston 22 is also provided with a plug 32 and a relief valve 34, whose functions will be given later. A plurality of circumferentially spaced hydraulic jacks 36 pivotally extend between spacer 18 and the piston 22. The lower end of one jack may be secured to the plug 32 as indicated. The interior of cylinder 14 is provided with a plurality of angularly spaced guide elements 38 which are biased by springs 40 against the pipe 10 in order to center the apparatus 12 with respect to the pipe 10.

The lower chamber portion 30 communicates with a circumferential passage or chamber 42 defined by cylindrical elements 44 and 46 whose upper rims are secured to the lower rims of cylinders 14 and 16 as by rivets, welding or the like. The lower rims of 44 and 46 are connected by an annular wall member 48.

The inner cylindrical member 44 is provided, at its lower portion, with a plurality of apertures or orifices 50 which extend completely therearound. Above the apertures 50, the cylinder 44 is provided with a circumferential seal 52 having a plurality of vents 54 extending axially thereof.

Annular walls 56 and 58 depend downwardly and laterally, respectively, from an upper rim or flange portion 60 of cylinder 46 and the exterior of cylinder 46. Wall 58 is provided with bushings 60 through which pass diametrically opposed rods 62. The upper ends of rods 62 are connected to bell cranks 64 as by pins, the cranks being supported by bearings 68. The ends of a U-shaped handle 70 terminate in blocks 72 connected to bell cranks 64.

The lower portion of cylinder 46 is secured to a cup-shaped member 74 provided with bushings 76 through which the rods 62 also pass. An annulus 78, surrounding the cylinder 46 and guided by rods 80, is connected to the lower ends of rods 62.

A plurality of circumferentially spaced trowels 82, each hingedly connected at 83 to wall 48, are each provided with eyes 84. An equal number of eyes 86 is secured to the sliding annulus 78, these sets of eyes being connected by links 88.

The operation of the apparatus is as follows: A cementitious mixture 90, the coating or lining substance, is placed into the lower chamber 30 through the aperture of plug 32. The pipe 10 is fixedly positioned, either in its place of use or at a place of manufacture. The apparatus 12 is placed around the pipe and cables are secured to eyes 20.

The apparatus 12 is now raised by the cables and, simultaneously, the hydraulic jacks 36 are expanded causing the piston 22 to move downwardly. Piston motion downward causes the cementitious lining material 90 to be exuded from chambers 30 and 42 outwardly through orifices 50 and onto the exterior of pipe 10. It will be noted that the grout 90 is thus applied in a direction normal to the surface of the pipe 10.

Concurrently, the handle 70, either manually or by some suitable latch mechanism, is actuated causing bars 62 by virtue of bell cranks 64 to move downwardly, thus moving annulus 78 down. Such motion of 78 causes the hinged trowels 82, by virtue of their connections through links 88, to swing inwardly towards pipe 10 and thus bear against and smooth the freshly exuded coating 92.

During the coating process, the valve 34 functions as a relief valve valve to maintain the pressure within chamber 30 below any desired amount. The radial thickness at seal 52 determines the thickness of the coating 92 as well as the smoothing force the trowels 82 exert on the coating. Vents 54 in the seal 52 permit the escape of air.

The relationship between the rate at which the apparatus 12 is moved relative to the pipe 10, the rate at which the piston 22 moves downwardly, and the smoothing force exerted by the trowels 82 on the coating 92 may be varied to suit the desired type and thickness of coating.

Turning now to the embodiment of the invention shown in FIGURE 4 wherein a pipe is to be coated or lined on its interior, the elements which correspond to those of the embodiment of FIGURE 1 bear the suffix 0. Because of the similarity of structure, a detailed description of this embodiment is deemed unnecessary and its operation will be given forthwith.

Cables are secured within eyes 200 and the apparatus 120 is lifted, the pipe 100 remaining fixed. Simultaneously, the hydraulic jacks 360 push piston 220 down, causing the cementitious coating material 900 to be exuded from lower chambers 300 and 420 through orifices 500 onto the interior surface of pipe 100. The coating is thus applied at right angles to the surface of the pipe. Concurrently, lever 700, either manually or by a suitable latch mechanism, is actuated causing bell crank 640 to push rod 620 down. The lower end of rod 620 being secured to disc 780, the latter moves down on guide rod 800. By virtue of links 880 connecting the eyes 860 on disc 780 to the eyes 840 on trowels 820, downward motion of the disc 780 causes the trowels to move outwardly on hinges 830. The trowels thus smooth the freshly applied coating 920 to the pipe's interior surface.

While not shown, the piston 220 may be provided with a relief valve to maintain the pressure in chamber 300 below any desired value. Vents 540 in seal 520 (the latter being carried by wall 460) permit the escape of air. Spring biased guides 380 are secured to cylinder wall 460 by struts 381 and 383.

In the above description, the pipes have been illustrated as circular in cross-section. Obviously, any other cross-section pipe may be lined with the apparatus of the invention by making the apparatus of a similar cross-section. It is also to be noted that it is not necessary that the pipes to be coated be vertically disposed since the force which causes the exudation of the cementitious lining material is derived solely from the force of the hydraulic jacks.

In the event that the coating thickness varies angularly, certain trowels may swing more or less than the remainder by changing the length of certain links 83 (880). Further, springs may be included in these links to permit swinging of the trowels to pass any obstruction on the surface to be coated.

I claim:

1. An apparatus for lining a wall of a conduit comprising means defining a chamber adapted to be positioned in spaced relationship to the conduit wall, means to vary the volume of said chamber, an annular cylindrical passageway communicating with said chamber and containing a plurality of orifices in a wall thereof adapted to be adjacent said conduit wall, a circumferential seal disposed between said passageway and said conduit wall adapted to determine the thickness of the lining applied to said conduit, said seal containing vents to permit venting of air as said lining is applied, and trowel means disposed adjacent said passageway and said conduit wall.

2. The apparatus of claim 1 including means carried by said apparatus for varying the position of the trowel.

3. The apparatus of claim 1 wherein said means for varying the volume of the chamber is a piston.

4. The apparatus of claim 1 wherein said trowel is hinged to the apparatus.

5. The apparatus of claim 1 wherein said trowel means comprises a linkage terminating adjacent the lower portion of the apparatus and varied in position by the linkage, and means coupled to the linkage for actuating it exteriorly of the chamber.

6. The apparatus of claim 5 wherein said last recited means is a linkage, a portion of which is surrounded by the said lower chamber end.

7. The apparatus of claim 5 wherein said last recited means is a linkage located exteriorly of the lower end of the chamber.

8. An apparatus for lining the inside wall of a conduit comprising means defining a chamber adapted to be positioned within said conduit in spaced relationship to said inner conduit wall, means to vary the volume of said chamber, a circumferential passageway communicating with said chamber and containing a plurality of orifices in a wall thereof adapted to be disposed adjacent said inner conduit wall, a circumferential seal connected to said orifice containing wall and adapted to contact said inner conduit wall and adapted to determine the thickness of the lining applied to said conduit, said seal containing vents to permit venting of air as said lining is applied, trowel means disposed adjacent said passageway and said conduit wall, and means for varying the position of said trowel means.

9. An apparatus for lining the outside wall of a conduit comprising means defining a chamber adapted to be positioned around said conduit and in spaced relationship to said outside conduit wall, means to vary the volume of said chamber, a circumferential passageway connected with said chamber and containing a plurality of orifices in a wall adapted to be disposed adjacent said outer conduit wall, a circumferential seal connected to the said orifice containing wall and adapted to contact said outer conduit wall to determine the thickness of the lining applied to said conduit, said seal containing vents to permit venting of air as said lining is applied, trowel means disposed adjacent said passageway and said conduit wall, and means for varying the position of said trowel means.

10. A method of lining a wall of a conduit with a lining material comprising the steps of positioning a chamber containing lining material in spaced relationship to said conduit wall, exuding lining material from said chamber through a plurality of orifices onto said conduit wall to a predetermined thickness while moving said chamber in a direction at right angles to the exudation, said thickness being determined by seal means positioned between said conduit wall and said chamber, venting air through said seal means during said exudation step, and simultaneously smoothing the surface of the exuded material by the application of a force thereto, the force exerted on the lining material to smooth it being independent of the force which exudes the lining material from the chamber.

References Cited by the Examiner

UNITED STATES PATENTS

| | | | |
|---|---|---|---|
| 288,034 | 11/83 | Detrick | 25—32 |
| 2,261,928 | 11/41 | Perkins et al. | 118—306 |
| 2,605,533 | 8/52 | Hirsh | 25—38 |
| 2,863,204 | 12/58 | Timothy et al. | 25—38 |
| 2,945,278 | 7/60 | Robertson | 25—38 |

FOREIGN PATENTS 776,344   6/57   Great Britain.

ROBERT F. WHITE, Primary Examiner.

WILLIAM J. STEPHENSON, MICHAEL V. BRINDISI, ALEXANDER H. BRODMERKEL, Examiners.